(12) United States Patent  
Badie

(10) Patent No.: US 9,505,327 B1
(45) Date of Patent: Nov. 29, 2016

(54) SANITARY HEADREST COVER

(71) Applicant: B. Alex Badie, Corinth, TX (US)

(72) Inventor: B. Alex Badie, Corinth, TX (US)

( * ) Notice: Subject to any disclaimer, the term of this patent is extended or adjusted under 35 U.S.C. 154(b) by 0 days.

(21) Appl. No.: 14/529,473

(22) Filed: Oct. 31, 2014

Related U.S. Application Data

(60) Provisional application No. 61/962,103, filed on Oct. 31, 2013.

(51) Int. Cl.
    *A47C 7/46* (2006.01)
    *B60N 2/60* (2006.01)
    *A47C 31/00* (2006.01)
    *B60N 2/48* (2006.01)

(52) U.S. Cl.
    CPC ........... *B60N 2/6081* (2013.01); *A47C 31/007* (2013.01); *B60N 2/48* (2013.01); *B60N 2/6009* (2013.01)

(58) Field of Classification Search
    CPC ...... A47C 7/386; A47C 31/007; B60N 2/60; B60N 2/6081; B60N 2/6009; B60N 2/48
    See application file for complete search history.

(56) References Cited

U.S. PATENT DOCUMENTS

| | | | | |
|---|---|---|---|---|
| 1,168,842 A * | 1/1916 | Albrecht | ............... | A61G 15/125 297/221 |
| 2,536,592 A * | 1/1951 | Caesar | ................. | B60N 2/4876 297/221 |
| 3,654,064 A * | 4/1972 | Laumann | ............... | A61G 9/003 220/DIG. 30 |
| 4,206,945 A * | 6/1980 | Kifferstein | ........... | B60N 2/6036 297/220 |
| 7,726,735 B2 * | 6/2010 | Resendez | ............. | B60N 2/4879 297/188.06 |
| 2010/0263793 A1 * | 10/2010 | Ylitalo | .................... | A01N 25/34 156/714 |
| 2013/0078372 A1 * | 3/2013 | Lazzari | .................. | A01N 25/34 427/207.1 |
| 2013/0320720 A1 * | 12/2013 | Steinmetz | ................ | A47C 7/62 297/219.1 |

* cited by examiner

*Primary Examiner* — Philip Gabler
(74) *Attorney, Agent, or Firm* — Kenneth L Tolar

(57) ABSTRACT

A sanitary headrest cover includes a sheet treated with a disinfecting agent having an adhesive strip on a rear surface. The sheet is secured to the upper end of a passenger seat to protect a passenger from bacteria and other contaminants on the headrest.

4 Claims, 1 Drawing Sheet

SANITARY HEADREST COVER

CROSS REFERENCE TO RELATED APPLICATIONS

This application is entitled to the benefit of provisional patent application No. 61/962,103 filed on Oct. 31, 2013, the specification of which is incorporated herein by reference.

BACKGROUND OF THE INVENTION

The present invention relates to a sanitary cover for preventing the transmission of pathogens and other contaminants from a headrest to a passenger.

DESCRIPTION OF THE PRIOR ART

When an airline passenger occupies a seat, any pathogens, debris or other contaminants on the head often adhere to the headrest where they are later transferred to a subsequent passenger. The repeated transmission of certain contaminants can cause serious illness or death. Furthermore, because of frequent passenger traffic within airplanes, headrests are ideal conduits for spreading chemical weapons. Accordingly, there is currently a need for a device that protects a vehicle passenger's head from infectious substances located on a passenger seat. The present invention addresses this need by providing a sanitary cover that is quickly securable to a headrest to protect a passenger and a passenger seat from contamination.

SUMMARY OF THE INVENTION

The present invention relates to a sanitary headrest cover comprising a sheet saturated with a disinfecting agent having an adhesive strip on a rear surface. The sheet is adhesively secured to the upper end of a passenger seat to protect a passenger from bacteria and other contaminants that may be present on the headrest.

It is therefore an object of the present invention to provide a sanitary cover for a passenger seat headrest.

It is another object of the present invention to provide a sanitary headrest cover that prevents the spread of bacteria and other pathogens.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
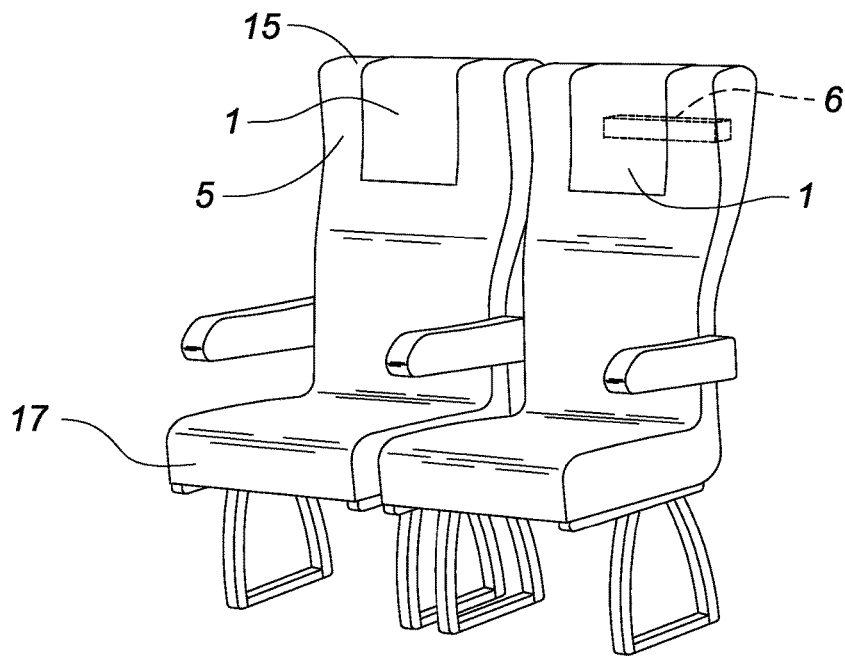
FIG. 1 is a perspective view of a pair of passenger seats with the headrest cover according to the present invention secured thereto.
Figure 2:
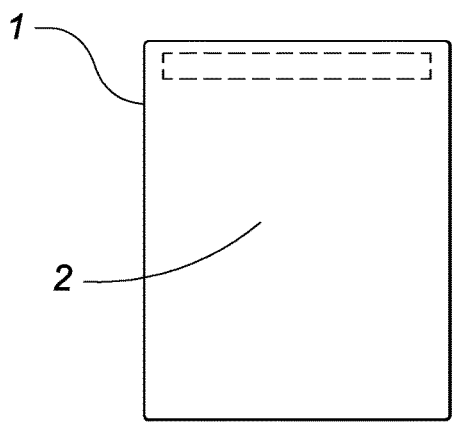
FIG. 2 is a front, plan view of the headrest cover.
Figure 3:
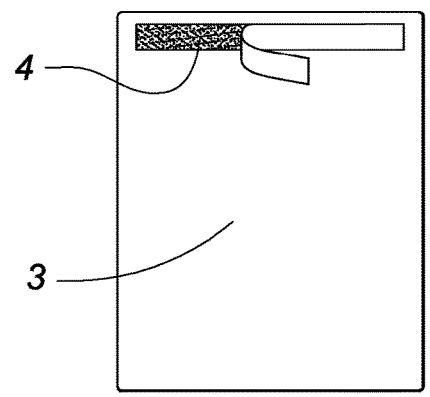
FIG. 3 is a rear view of the headrest cover.
Figure 4:
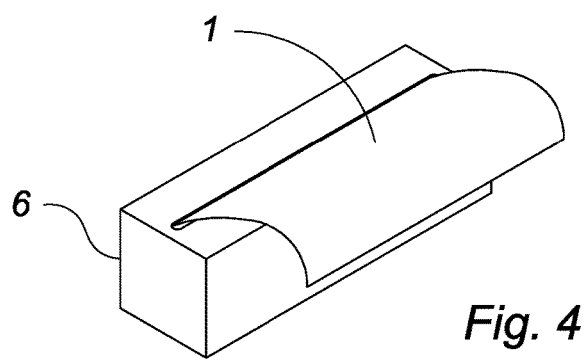
FIG. 4 depicts a dispenser for retaining a plurality of headrest covers.

The present invention relates to a sanitary headrest cover comprising a sheet 1, preferably formed of a spun, polyethylene fiber or a similar, tear-resistant, microbial-impermeable material. The polyethylene fiber provides a barrier to all microbial organisms, oils, water, debris and other contaminants while allowing airflow therethrough. The sheet includes a front surface 2, a rear surface 3 and a plurality of peripheral edges. On the rear surface is a double-sided adhesive strip 4 having a removable, protective layer thereon that is removed to secure the sheet to the upper edge 15 of a passenger seat 17 headrest 5.

The sheet is impregnated, saturated or surface treated with silver di-hydrogen citrate (SDC) or a similar disinfectant that eradicates most commonly spread pathogens. Alternatively, the sheet could be constructed with dual-ply absorbent paper having a thin, polypropylene plastic layer on a rear surface. The paper would not be pre-treated with a disinfectant thereby eliminating the need to vacuum seal the cover within a designated storage container.

The cover can be packaged as a roll of separable sheets stored within a housing 6 that dispenses a sheet upon payment of a fee, or as individual sheets, each hermetically sealed within a disinfected storage bag. Furthermore, the dispenser could be integrated with a passenger seat for convenient access. For example, the dispenser could seat within a recess formed on the rear surface of the headrest area, which would accessible by a passenger sitting behind the passenger seat.

The above-described device is not limited to the exact details of construction and enumeration of parts provided herein. For example, though the device has been primarily depicted and described as a sheet, it could instead be a hollow shell or bag that fits over a passenger seat headrest. Either embodiment could have a plastic layer on its rear surface that may or may not be saturated with a disinfectant material. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a passenger seat having a headrest at an upper end, said headrest having an upper edge and a rear surface, a sanitary headrest cover comprising:
  a sheet formed of a tear-resistant, microbial-impermeable, dual-ply paper having a front surface, a rear surface and a plurality of peripheral edges, said sheet treated with a disinfectant silver di-hydrogen citrate for eradicating pathogens, wherein said sheet is housed within a dispenser that is integral with said passenger seat;
  means for attaching said sheet to the upper edge of said headrest, wherein said means comprises a double-sided adhesive strip on the rear surface of said sheet and a removable, protective layer on said adhesive strip which is removed to secure the sheet to the upper edge of the headrest.

2. The sanitary headrest cover according to claim 1 wherein said sheet is constructed with polyethylene fiber.

3. The sanitary headrest cover according to claim 1 wherein said dispenser seats within a recess formed on the rear surface of the headrest to be accessible by a passenger sitting behind the passenger seat.

4. The sanitary headrest cover covering to claim 1 wherein said sheet has a thin, polypropylene plastic layer on a rear surface.

* * * * *